United States Patent [19]

Harvey

[11] 4,417,309

[45] Nov. 22, 1983

[54] AIRCRAFT NAVIGATION COMPUTER

[76] Inventor: Philip C. Harvey, 17 Michael Ave., Nashua, N.H. 03062

[21] Appl. No.: 234,404

[22] Filed: Feb. 13, 1981

[51] Int. Cl.³ .............................................. G06F 15/50
[52] U.S. Cl. ................................. 364/450; 340/27 AT
[58] Field of Search ............... 364/443, 450, 448, 449, 364/458, 460; 340/27 AT

[56] References Cited

U.S. PATENT DOCUMENTS

| | | | |
|---|---|---|---|
| 2,475,314 | 7/1949 | Dehmel | 364/450 |
| 3,532,267 | 10/1970 | Tobin | 364/450 |
| 3,558,867 | 1/1971 | Pahi | 364/569 |
| 3,619,580 | 11/1971 | Swale | 364/450 |
| 3,967,098 | 6/1976 | Harnagel et al. | 364/443 |

Primary Examiner—Felix D. Gruber
Assistant Examiner—Stuart D. Dwork
Attorney, Agent, or Firm—Kenway & Jenney

[57] ABSTRACT

In the aircraft navigation computer disclosed herein, a first voltage is generated which is varied as function of the position of a map strip and this voltage is compared with a second voltage which varies in accordance with the passage of time. A signal is generated when these voltages cross each other, signifying satisfaction of the navigation equation: distance = time × speed.

14 Claims, 4 Drawing Figures

AIRCRAFT NAVIGATION COMPUTER

BACKGROUND OF THE INVENTION

The present invention relates to an aircraft navigation computer and more particularly to such a computer useful to the pilot private plane where the pilot must perform his own navigation functions.

A variety of aids have been devised and sold for the purpose of enabling pilot to solve basic navigation problems. Examples of these are various slide rules, circular and straight, and pocket calculators. While these devices can perform the necessary calculations, often to a much higher degree of precision than is actually useful to the pilot, they typically require that the pilot work separately with a calculator, his charts and maps, and/or a separate piece of paper or clipboard. Managing such a variety of equipment can be fairly trying, particularly under adverse flying conditions or when distracted by passengers.

Among the several objects of the present invention may be noted the provision of an aircraft navigation aid in which elapsed time calculations are coordinated with map plotting; the provision of such a device in which course plotting and time calculation are combined in a single selfpowered unit; the provision of such a device which does not require attachment to or drawing power from the aircraft; the provision of such a device which minimizes the time required by the pilot to perform navigation duties; the provision of such a device which will operate essentially automatically and which will provide a signal when a predetermined checkpoint should have been reached; the provision of such apparatus which will provide an indication of the amount of time left to reach a predetermined checkpoint; the provision of such an apparatus which is highly reliable; the provision of such an apparatus which may be operated instinctively; the provision of such a device which may be powered by long-lived batteries; and the provision of such apparatus which is reliable and is of relatively simple and inexpensive construction.

Other objects and features will be in part apparent and in part pointed out hereinafter.

SUMMARY OF THE INVENTION

Briefly, apparatus according to the present invention involves, in a compact housing, a pair of manually driven rollers for receiving and scrolling a map strip from one point to another point. Translation means, such as a multiturn potentiometer, is mounted intermediate said points and is provided with wheel means adapted to frictionally engage the map strip and to be driven thereby. A selected voltage is applied across the potentiometer thereby to provide, from the potentiometer, a first voltage which varies as a function of movement of or distance along the map strip. A second voltage is generated which varies in proportion to the passage of time. Means are further provided for generating a signal when the values of the first and second voltages cross.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
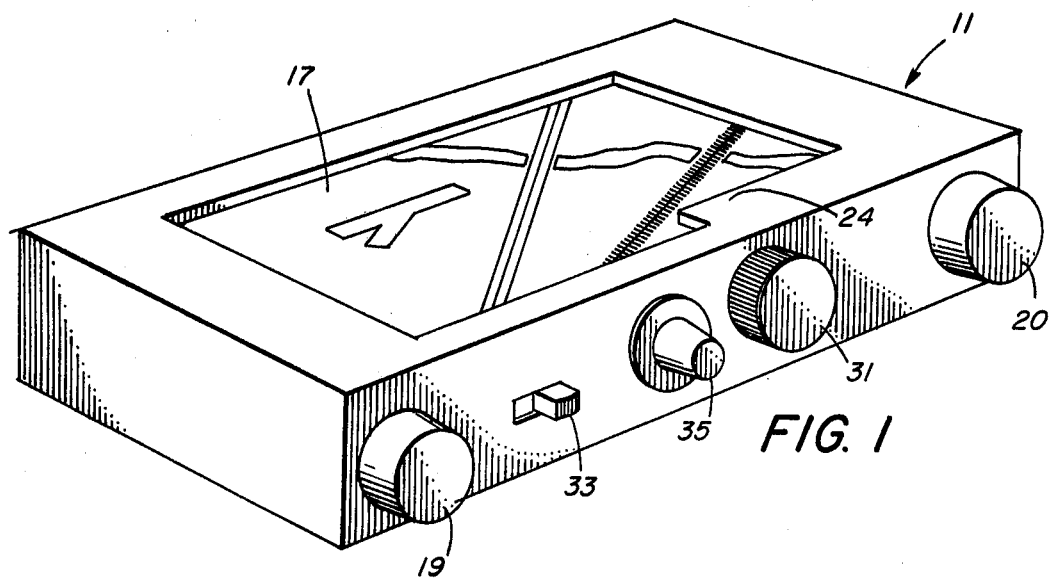
FIG. 1 is a perspective view of apparatus constructed in accordance with the present invention showing the relative arrangement of a map strip employed with the apparatus and various manual controls.
Figure 2:
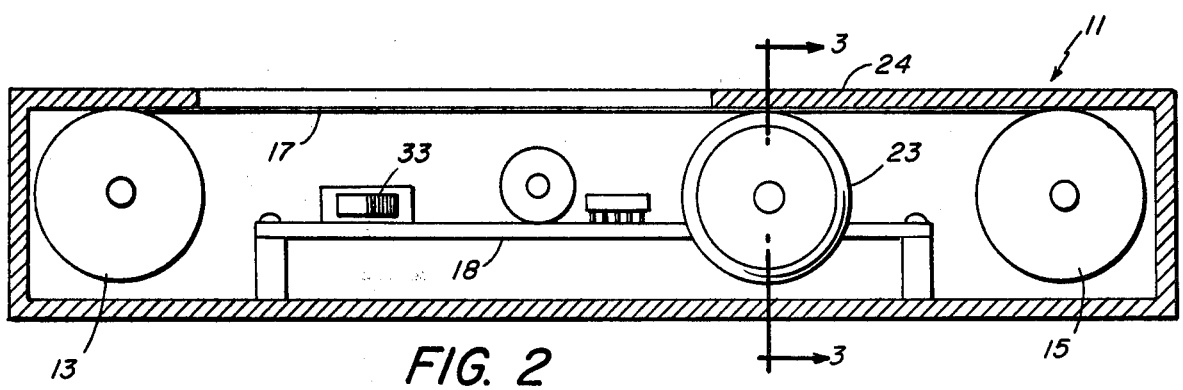
FIG. 2 is a side view, in section, through the apparatus of FIG. 1.

Referring now to FIG. 1, the apparatus of the present invention is preferably contained within a compact hand-held rectangular enclosure such as that indicated by reference character 11. Journaled at each end of the enclosure 11 are rollers 13 and 15 (see FIG. 2). Rollers 13 and 15 are adapted to receive a map strip, indicated by reference character 17, and are provided with respective knobs 19 and 20 which project externally of the enclosure 11. These knobs co-operate with the rollers to permit a map strip 17 to be scrolled from one roller to another within the enclosure 11. The top of the enclosure 11 is open as indicated so that the map strip can be observed and/or written upon as is customary for noting the time of passage of various landmarks, etc.

Figure 3:
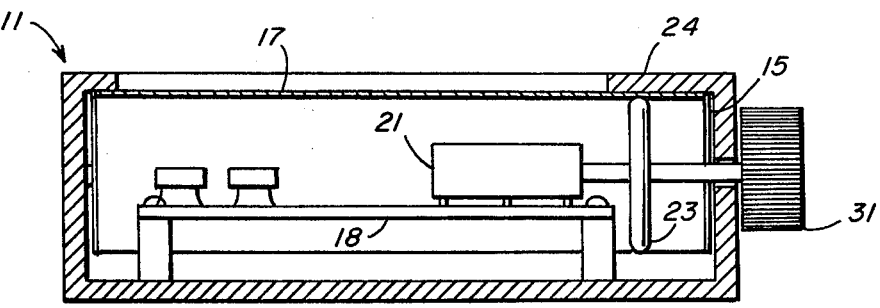
FIG. 3 is a transverse sectional view, taken substantially on the line 3—3 of FIG. 2.

Also mounted within the enclosure 11 is a circuit board 18 carrying the various circuit components described in greater detail hereinafter. Among these components is a multi-turn potentiometer 21 (see FIG. 3). This potentiometer is supported with its shaft perpendicular to the direction of movement of the map strip and is provided with a rubber rimmed wheel 23 which frictionally engages the map strip 17. Frictional contact may, for example, be maintained by a portion 24 of the housing 11 which overlies wheel 23, together with the natural compliance of the circuit board 18. Accordingly, as the map strip is scrolled from one of the rollers to the other, the shaft of the potentiometer 21 will be rotated.

With reference to FIG. 1, the other operator controls include an ON/OFF switch 33, a knob 35 used for speed setting as described in greater detail hereinafter, and a knob 31 which is mounted on the shaft of the potentiometer 21, alongside the friction wheel 23.

Figure 4:
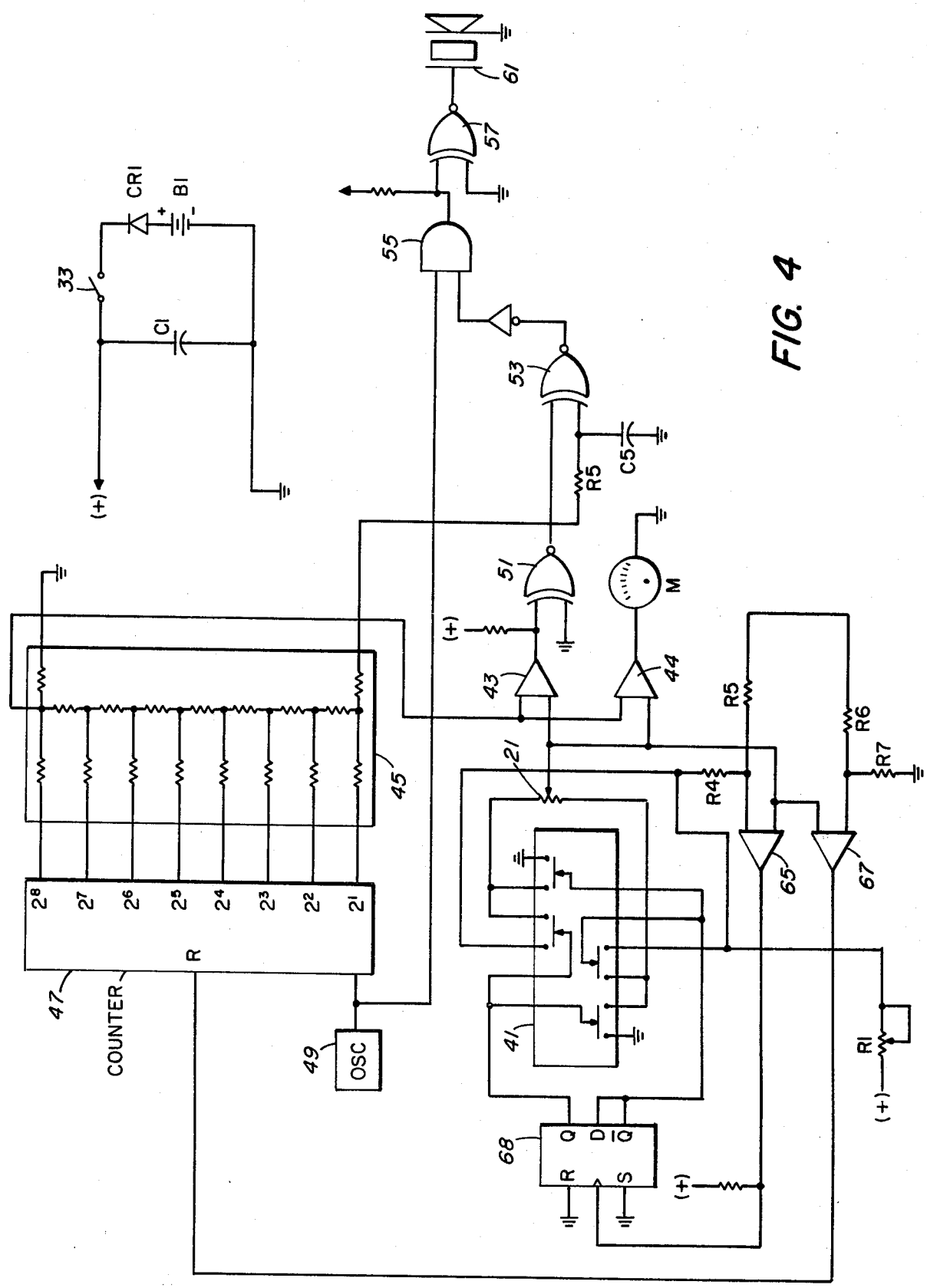
FIG. 4 is a schematic circuit diagram of computational and signal circuitry employed in the apparatus of FIG. 1.

As indicated previously, the apparatus of the present invention operates by comparing two voltages, one of which varies as a function of time and the other of which is generated as a function of the position of the map strip. The circuitry for appropriately computing and generating these two voltages and for detecting and signalling the desired crossover condition is illustrated at FIG. 4. Power for the entire circuit is obtained from a standard 9-volt battery B1 applied through a protective diode CR1 and the ON/OFF switch 23. A shunt capacitor C1 is provided to delay turning off.

A portion of the supply voltage is applied to the potentiometer 21 through a variable resistance R1 and a quad bilateral semiconductor switch 41, connected as a reversing switch. This reversing switch circuitry permits the polarity of the voltage applied across the potentiometer 21 to be selectively reversed by control circuitry described hereinafter.

The resistance R1 is controlled by the knob 35, and, as suggested previously, is utilized to adjust for different ground speeds. Knob 35 is preferably roughly calibrated to permit an initial setting to the expected ground speed but, by a procedure described in greater detail hereinafter, a more accurate setting may be empirically derived while underway. The basic calibration is such that the voltage produced across the multi-turn potentiometer 21 is an inverse function of the indicated speed. Thus, assuming the ground speed resistance R1 is properly set, the output voltage from the potentiometer 21 may be considered to be a calculated time of arrival at the point indicated by the position of the map strip. The output voltage from the potentiometer 21 is applied as one input to a comparator 43 and as one input to an amplifier 44. A time varying voltage is applied to the other input of both the comparator 43 and the amplifier 44.

As will be understood, a position indicating voltage could also be generated by a so-called shaft encoder driven by the wheel 23, together with the usual associated circuitry. Such a form of translating means should be understood to be within the scope of the present invention. Presently, however, the potentiometer shown is preferred, particularly since it facilitates reversal of the direction of voltage change for the purposes described hereinafter.

The time varying voltage applied as the second input to comparator 43 and amplifier 44 is obtained from a resistive ladder network 45, successive stages of which are controlled by successive stages of a binary counter 47, i.e. to perform a D/A (digital to analog) conversion. Counter 47 is, in turn, steadily advanced by an oscillator 49. In the embodiment illustrated, a 4 kHz oscillator and an eight stage counter were utilized. While an integrator circuit might also be used to generate a time varying voltage, this voltage would not scale to power supply voltages as will the output of the counter and D/A circuitry just described. This failure to scale would produce errors if the supply voltage changes.

As indicated previously, the voltage representing the calculated time of arrival and the time varying voltage are both provided as inputs to a comparator 43. The output from comparator 43 is inverted, by a gate indicated by reference character 51, and is applied directly as one input to an exclusive-or (XOR) gate 53 and is applied, in delayed fashion, to the other input of this gate, the delay being provided by a resistor R5 and a capacitor C5. The output from the XOR gate 53 will thus be a pulse occurring every time the output from comparator 43 changes state, the width of the pulse being determined by the delay provided by resistor R5 and capacitor C5. The output pulse from XOR gate 53 is combined, in an AND gate 55 with the 4 kHz signal generated by the oscillator 49 to yield a burst signal. This burst signal is applied through a buffering gate 57, to an efficient piezoelectric speaker 61. Accordingly, it can be understood the speaker 61 will emit a brief tone burst each time the input voltages to the comparator 43 cross each other. As used herein, the term "cross" should be understood to encompass becoming equal since that is the basic condition which is of interest. The crossing detector illustrated is, however, preferred since the brief sound pulse generated as a result of the crossing conserves the battery.

The voltage applied to the potentiometer 21 is also applied, outside of the reversing switch 41, to a resistive voltage divider comprising resistors R4—R7. The middle two resistors in this divider network is much larger than the other two, which are equal. Thus, the divider network provides a pair of voltages, each of which is near, but slightly spaced from, one end of the range of voltages which can be provided by the potentiometer 21. These voltages are used to provide end-of-range signals as described hereinafter and, for this purpose, each is applied as one input to a respective comparator 65 and 67. The output voltage from the potentiometer 21 is applied as the other input to each of these comparators.

As will be understood, the comparator 67 will provide an output signal when the output voltage from the potentiometer approaches the lowest end of its range and the comparator 65 will provide an output signal when the output voltage from the potentiometer approaches the highest end of its range. For convenience in discussion, the low end may be considered the home or start position and the high end can be considered the end or final state. It should be understood, however, that neither of these states respond to one end or the other of the physical rotation of the potentiometer since the voltage across the potentiometer can be reversed by means of the quad bilateral switch 41. Thus, navigation can be in either direction along the map strip.

The output signal from the comparator 67 is used to reset and inhibit the counter 47. Thus, the timing operation of this circuitry will not begin until the setting of the potentiometer is moved away from its extreme (low voltage) or start setting.

The output signal from the comparator 65 is applied to toggle a flip-flop 68 which controls the quad bilateral switch 41 to effect reversing. Thus, any time the voltage from the potentiometer moves into the end zone, the flip-flop 68 is toggled and the voltage across the potentiometer is reversed, i.e. in a manner appropriate for initiating a return trip. Since reversing of the voltage across the potentiometer 21 from the end zone will put it back in the beginning zone, the comparator 67 will then be triggered so as to automatically reset the counter, e.g. appropriate for initiating a return trip. In operation, however, it is not necessary that the length of the trip be constrained to the distance which can be accommodated by the multi-turn potentiometer 21. At some intermediate point, the potentiometer 21 can be returned to its starting point, using the knob 37 while holding the map strip to prevent its motion. Since the wheel 23 need engage the map strip with only light frictional pressure, this is easily accomplished manually.

In addition to providing a signal indicating that a predetermined checkpoint has been reached, the two computed voltages are utilized to provide an indication of the time left to reach a checkpoint. As indicated previously, the calculated time voltage derived from the multi-turn potentiometer 21 is applied as one input to amplifier 44 while the time varying voltage obtained from the D/A converter (counter 47 and ladder network 45) is applied as the other input. The output signal from the amplifier 44 drives a meter M so that the value indicated is proportional to the difference between the two input voltages to the amplifier. While an electromechanical, needle type meter is indicated, it should be understood that a digital type, e.g. utilizing a liquid crystal display, might also be used.

SUMMARY OF OPERATION

In typical use, the pilot/navigator will prepare an appropriate map strip and apply the strip to the rollers 13 and 15. Preferably, the parameters of the circuitry are selected to accommodate standard navigational maps. Initially, the map is positioned at the starting point of the trip and the potentiometer is turned to one extreme of its rotation so that it will move towards the other extreme as the map is advanced along the trip. The speed setting resistance R1 is then set at a first approximation of the expected groundspeed using the knob 35. Even though the switch 33 is turned on, timing will not start until the chart is advanced out of the start zone determined by the voltages applied to potentiometer 67. At the start, the pilot preferably advances the chart to a first known or checkpoint location. If the speed setting were perfectly accurate, the speaker signal would be triggered just as the craft passed over the reference point. However, if it does not, the speed may be adjusted as the craft passes over the checkpoint by merely empirically adjusting the knob 35 until the signal does sound. At this point, the speed is adjusted appropriately to the actual speed. The map strip 17 can then be successively advanced to checkpoints along the route and, at the time when each checkpoint should come up, the speaker will signal that expected event so that the pilot is alerted to look for and confirm passage over the reference point. In the meantime, the meter M will give the pilot a continuous indication of the calculated time left to reach a selected checkpoint. If any cumulative error builds up, correlation between timing and chart position can be reinitialized at any time by merely turning the knob 31, which controls the multiturn potentiometer 21, so as to produce a signal when the map is positioned in correspondence with actual location. In this way, the device effectively functions as a computing alarm clock which signals the pilot to look out for successive landmarks.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Navigation apparatus comprising:
   an enclosure;
   a pair of manually driven rollers for receiving and scrolling a map strip from one point on said enclosure to another point;
   intermediate said points, wheel means adapted to frictionally engage said map strip and be driven thereby;
   translation means, driven by said wheel means, so that the setting of said translation means is varied by movement of said map strip thereby to generate a first voltage which is in proportion to the set postion of said map strip;
   means for generating a second voltage, which second voltage varies as a function of the passage of time; and
   means for providing a perceptable indication of the relative values of said first and second voltages.

2. Apparatus as set forth in claim 1 wherein said indicating means comprises meter means for displaying a value indicative of the difference between said first and second voltages.

3. Apparatus as set forth in claim 1 wherein said indicating means comprises
   means for generating a signal when the values of said first and second voltages become equal.

4. Navigation apparatus comprising:
   an enclosure;
   a multiturn potentiometer;
   a pair of manually driven rollers for receiving and scrolling a map strip from one point on said enclosure to another point;
   intermediate said points, wheel means adapted to frictionally engage said map strip and be driven thereby, said multiturn potentiometer being driven by said wheel means;
   means for applying, across said potentiometer, a selected voltage whereby, when the setting of said potentiometer is varied by movement of a map strip, a first voltage will be generated which varies as a function of distance along the map strip;
   means for generating a second voltage, which second voltage varies as a function of the passage of time; and
   means for generating a signal when the values of said first and second voltage become equal in magnitude.

5. Apparatus as set forth in claim 4 further comprising:
   means, responsive to said first voltage, for reversing the polarity of the voltage applied across said potentiometer when the rotation of said potentiometer approaches either end of its range.

6. Navigation apparatus comprising:
   an enclosure;
   a multiturn potentiometer;
   a pair of manually driven rollers for receiving and scrolling a map strip from one point on said enclosure to another point;
   intermediate said points, wheel means adapted to frictionally engage said map strip and be driven thereby, said multiturn potentiometer being driven by said wheel means;
   means for applying, across said potentiometer, a selected voltage whereby, when the setting of said potentiometer is varied by movement of a map strip, a first voltage will be generated which varies as a function of distance along the map strip;
   means for generating a second voltage, which second voltage varies as a function of the passage of time; and
   meter means for displaying a value indicative of the difference between the values of said first and second voltages.

7. Navigation apparatus comprising:
   an enclosure;
   a multiturn potentiometer;
   a pair of manually driven rollers for receiving and scrolling a map strip from one point on said enclosure to another point;
   intermediate said points, wheel means adapted to frictionally engage said map strip and be driven thereby, said multiturn potentiometer being driven by said wheel means;
   means for applying, across said multiturn potentiometer, a selected voltage whereby, when the setting of said potentiometer is varied by movement of a map strip, a first voltage will be generated which varies as a function of distance along the map strip;
   an oscillator;
   a counter driven by said oscillator;
   a resistive ladder network driven by said counter for providing a second voltage, which second voltage varies in proportion to the value held in said counter; and means for indicating changes in the relative values of said first and second voltages.

8. Apparatus as set forth in claim 7 wherein said indicating means comprise meter means for displaying a value indicative of the difference between said first and second voltages.

9. Apparatus as set forth in claim 7 wherein said indicating means comprises means for generating a signal when the values of said first and second voltages become equal.

10. Apparatus as set forth in claim 7 further comprising:
means, responsive to said first voltage, for resetting said counter when said multiturn potentiometer approaches either end of its range.

11. Apparatus as set forth in claim 7 further comprising:
means, responsive to said first voltage, for reversing the polarity of the voltage applied across said multiturn potentiometer when said first voltage approaches one end of its range.

12. Navigation apparatus comprising:
an enclosure;
a multiturn potentiometer;
a pair of manually driven rollers for receiving and scrolling a map strip from one point on said enclosure to another point;
intermediate said points, wheel means adapted to frictionally engage said map strip and be driven thereby, said multiturn potentiometer being driven by said wheel means;
means for applying, across said multiturn potentiometer, a voltage which is manually adjustable in accordance with ground speed whereby, when the setting of said potentiometer is varied by movement of a map strip, a first voltage will be generated which varies as a function of calculated elapsed time corresponding to distance along the map strip;
means for generating a second voltage, which second voltage varies in proportion to the passage of time; and
means for indicating changes in the relative values of said first and second voltages.

13. Navigation apparatus comprising:
an enclosure;
a multiturn potentiometer;
a pair of manually driven rollers for receiving and scrolling a map strip from one point on said enclosure to another point;
intermediate said points, wheel means adapted to frictionally engage said map strip and be driven thereby, said multiturn potentiometer being driven by said wheel means;
means for applying, across said multiturn potentiometer, a voltage which is manually selected as a function of ground speed;
an oscillator;
a counter driven by said oscillator;
a resistive ladder network driven by said counter for providing a second voltage, which second voltage varies in proportion to the value held in said counter;
means, responsive to said first voltage, for resetting and inhibiting said counter when said multiturn potentiometer approaches either end of its range;
means, responsive to said first voltage, for reversing the polarity of the voltage applied across said multiturn potentiometer when said first voltage approaches one end of its range; and
means for generating a signal when the values of said first and second voltages become equal.

14. Apparatus as set forth in claim 13 wherein said signal generating means produces an audible tone burst when said voltages become equal.

* * * * *